United States Patent
Bankeström

(10) Patent No.: US 9,803,618 B2
(45) Date of Patent: Oct. 31, 2017

(54) MONITORING AND FAULT PREDICTION IN RELATION TO A MECHANICAL COMPONENT OF A ROTATING SYSTEM

(71) Applicant: Olle Bankeström, Västra Frölunda (SE)

(72) Inventor: Olle Bankeström, Västra Frölunda (SE)

(73) Assignee: AKTIEBOLAGET SKF, Gothenburg (SE)

( * ) Notice: Subject to any disclaimer, the term of this patent is extended or adjusted under 35 U.S.C. 154(b) by 538 days.

(21) Appl. No.: 14/360,530

(22) PCT Filed: Nov. 7, 2012

(86) PCT No.: PCT/SE2012/000178
§ 371 (c)(1),
(2) Date: May 23, 2014

(87) PCT Pub. No.: WO2013/077794
PCT Pub. Date: May 30, 2013

(65) Prior Publication Data
US 2014/0324236 A1   Oct. 30, 2014

(30) Foreign Application Priority Data
Nov. 23, 2011 (SE) ...................... 1100868

(51) Int. Cl.
*F03D 7/00* (2006.01)
*G01M 13/04* (2006.01)
(Continued)

(52) U.S. Cl.
CPC ............... *F03D 7/00* (2013.01); *F03D 17/00* (2016.05); *F03D 80/70* (2016.05);
(Continued)

(58) Field of Classification Search
CPC ............ F03D 7/00; F03D 17/00; F03D 80/70; G01M 13/045; F05B 2240/50;
(Continued)

(56) References Cited

U.S. PATENT DOCUMENTS

| 5,316,335 A | 5/1994 | Gray | |
| 6,297,645 B1 * | 10/2001 | Eriksson | G01R 31/1272 324/536 |

(Continued)

FOREIGN PATENT DOCUMENTS

| CN | 101309821 A | 11/2008 |
| DE | 4441828 A1 | 6/1995 |

(Continued)

OTHER PUBLICATIONS

Wind turbine condition monitoring system, Mani Entezami, Stuart Hillmansen, and Clive Roberts, University of Birmingham (2010).*

(Continued)

*Primary Examiner* — Sean Shechtman
*Assistant Examiner* — Michael W Choi
(74) *Attorney, Agent, or Firm* — Brian Peckjian; SKF USA Inc. Patent Dept.

(57) ABSTRACT

The present invention relates to a system configured to monitor a condition of a rotating system comprising a main bearing, the monitoring arrangement having a first measurement device configured to be arranged at a first location in proximity of the main bearing for determining a first measurement indicative of a current flow at the first location, and a control unit connected to the measurement device. The control unit is further configured to form a first parameter based on the first measurement, match the first parameter with a plurality of predetermined current flow profiles, each of the plurality of predetermined current flow profiles being indicative of a condition of the rotating system, determine, (Continued)

if a matching current flow profile is found, a relevance level for the corresponding condition, and provide an indication of an alarm if the relevance level is above a predetermined threshold.

11 Claims, 3 Drawing Sheets

(51) Int. Cl.
F03D 80/70 (2016.01)
F03D 17/00 (2016.01)
F16C 19/52 (2006.01)
F16C 41/00 (2006.01)

(52) U.S. Cl.
CPC ....... *G01M 13/045* (2013.01); *F05B 2240/50* (2013.01); *F05B 2260/80* (2013.01); *F16C 19/52* (2013.01); *F16C 41/004* (2013.01); *F16C 2233/00* (2013.01); *F16C 2300/14* (2013.01); *F16C 2360/31* (2013.01); *Y02E 10/725* (2013.01)

(58) Field of Classification Search
CPC .... F05B 2260/80; F16C 19/52; F16C 41/004; F16C 2233/00; F16C 2300/14; F16C 2360/31; Y02E 10/725
USPC .......................................................... 700/287
See application file for complete search history.

(56) References Cited

U.S. PATENT DOCUMENTS

| 6,300,701 | B1* | 10/2001 | Ong | F16C 17/24 310/179 |
|---|---|---|---|---|
| 2006/0209472 | A1 | 9/2006 | Koui et al. | |
| 2007/0162241 | A1* | 7/2007 | Yuan | G05B 19/4065 702/81 |
| 2010/0023307 | A1* | 1/2010 | Lee | G05B 23/0254 703/7 |
| 2011/0313701 | A1* | 12/2011 | Higgins | G01R 31/343 702/66 |
| 2012/0136627 | A1* | 5/2012 | Jensen | G05B 23/0235 702/182 |
| 2012/0330580 | A1* | 12/2012 | Fruh | G01M 13/04 702/57 |

FOREIGN PATENT DOCUMENTS

| DE | 29511172 U1 | 2/1996 |
|---|---|---|
| DE | 2011-09-09 A1 | 7/1997 |
| DE | 19800815 C1 | 2/1999 |
| EP | 2288000 A2 | 2/2011 |
| EP | 2290233 A2 | 3/2011 |
| JP | 2001-315608 A | 11/2001 |
| WO | 2009083006 A1 | 7/2009 |
| WO | 2011107110 A1 | 9/2011 |

OTHER PUBLICATIONS

Xiang Gong, Wei Qiao; "Bearing fault detection for direct-drive wind turbines via stator current spectrum analysis;" Energy Conversion Congress and Exposition (ECCE), Sep. 2011, 313-318.
Raymond Ong, Dynmond JH, Findlay R D; "A comparison of techniques for measurement of shaft current in rotating machines;" Dec. 1997, 12, 4, whole document.

* cited by examiner

MONITORING AND FAULT PREDICTION IN RELATION TO A MECHANICAL COMPONENT OF A ROTATING SYSTEM

CROSS-REFERENCE

This application is the US national stage of International Application No. PCT/SE2012/000178 filed on Nov. 7, 2012, which claims priority to Swedish Patent Application No. SE1100868-7 filed Nov. 23, 2011.

FIELD OF THE INVENTION

The present invention relates to an arrangement adapted to monitor a condition, specifically in relation to large-scale rotating systems with blades connected to a main shaft. The present invention also relates to a corresponding method, computer program product and management server adapted for monitoring such a condition.

BACKGROUND ART

Large-scale rotating systems with blades connected to a main shaft have been used for a long time for, for example a field of technology with large-scale rotating systems is the field of horizontal axis wind turbines. It is known to control the pitch (longitudinal rotational state) of the blades during operation in order to optimize the efficiency of operation of the rotating system. In rotating systems such as wind turbines, the main bearing, which connects the main shaft with a fixed structure—the nacelle in a wind turbine and—is subjected to substantial and varying forces during operation, for example due to wind and current conditions, etc.

In order to improve the up-time of, for example, a wind turbine, various parameters may be monitored, such as, for example, vibrations, lubricant pressure, etc. and transmitted to a remote location for review of service personnel.

For example, EP2290233 describes a system for management of wind turbines, specifically relating to determining and analyzing operational characteristics related to the operation of the wind turbine and determining whether a fault of the wind turbine is resettable.

Although the monitoring that is currently described in the art helps the scheduling of maintenance etc. and thereby may improve the availability of wind turbines and other similar rotating systems, failure modes that are not detected in time may exist.

Accordingly, there is desired to provide improvements to the above system for management of wind turbines and other rotating systems in order to enable more efficient, durable, and fail-safe monitoring and fault prediction. Thereby, for example the up-time of a wind turbine may be increased.

SUMMARY OF THE INVENTION

In view of the above-mentioned, a general object of the present invention is to provide improvements relating to the monitoring and fault prediction in relation to a rotating system, resulting in increased efficiency of the rotating system.

According to an aspect of the invention, these and other objects are achieved through an arrangement configured to monitor a condition of a rotating system comprising a main bearing, the monitoring arrangement comprising a first measurement device configured to be arranged at a first location in proximity of the main bearing for determining a first measurement indicative of a current flow at the first location, and a control unit connected to the measurement device, wherein the control unit is further configured to form a first parameter based on the first measurement, match the first parameter with a plurality of predetermined current flow profiles, each of the plurality of predetermined current flow profiles being indicative of a condition of the rotating system, determine, if a matching current flow profile is found, a relevance level for the corresponding condition, and provide an indication of an alarm if the relevance level is above a predetermined threshold.

From the field of electrical machines it is known that voltages generated on e.g. a main shaft may lead to discharge currents running from the main shaft through the bearings connected to the main shaft. Such discharge currents may lead to spark tracks, pitting and welding in the bearing rings or in the rolling elements thereby damaging the bearing. Eventually, discharge currents may lead to the breakdown of the bearing. Within the area of large-scale rotating systems such as wind turbines, the main bearing is not connected to a motor, a therefore buildup of charge in the main shaft is not expected. Thus, no current should pass through the main bearing.

However as for example the main shaft in a rotating system may enclose cabling for providing electrical power to one or more electrical motors arranged at the hub, a part of the current may take a different path outside of the cabling. A reason for this may for example be that equipment installed in a hub of the rotating system may have a capacitive coupling to the hub and/or to the shaft. Furthermore, there may be a ground potential depending on the configuration of the ground conductor at the hub. Accordingly, the shaft voltage may result in an electric current running through the bearing to ground. The shaft may be resistively and/or capacitively coupled to the bearing, leading to either a resistive current through the bearing or to capacitive buildup of charge resulting in a discharge current. Furthermore, as the system controlling the electrical motors may be a switched system powering the pitch engines using a switched bias coupling capacitively to ground, currents having high frequency overtones may flow through the bearing. Such overtones may be more damaging to the bearing compared to currents having lower frequencies as the impedance of the capacitive coupling from, the shaft to the bearing and from the bearing to ground is reduced with increasing frequency.

It is therefore desirable to measure the electrical current running through a main bearing also in the case where the bearing is not arranged as a part of an electrical motor. Specifically, by means of detecting and monitoring an electrical current flowing at the first location (relating to the induced voltage), in the proximity of the main bearing, and compare and match a first parameter relating to this electrical current flow with one of a plurality of predetermined current flow profiles, it may be possible determining a specific condition for example taking place at the main bearing of the rotating system.

According to one embodiment of the invention, the at least one electrical motor arranged at the hub may be a pitch control motor arranged at the hub and configured to control a pitch of at least one of said blades. For example, the frequency profile of the detected current flow may be indicative of a state of one or a plurality of pitch control motors arranged at the hub of the rotating system. Also, different running modes and wind conditions may be identified through analysis of the current through the main bearing.

The different states of the pitch control motors (e.g. "start mode", "steady run mode", and "stop mode") may have different (negative) effects on the main bearing. It may therefore be desirable to classify a resulting condition, and set the relevance level, differently in case the rotating system is in an operational mode having a longer cycle, such as for example when the rotation system is in a steady run mode having an essentially constant rotational speed of the main shaft.

Accordingly, by means of the invention it may be possible to predict and beforehand indicate a possible failure of e.g. the main bearing, by means of comparing a detected the electric current flow with predetermined current flow profiles, where each of the predetermined current flow profiles may relate to a specific condition relating to the operation of the rotating system. The predetermined current flow profiles may for example be determined based on historically data recorded using the first measurement device.

It may however not be necessary to record data over a long period, where a long period could be indicated as a period exceeding for example one hour. Rather, in an exemplary embodiment, also data recorded over a shorter period, such as at a regular "check-up" of the rotating system, may be used for determining an in essence real-time condition of the rotating system. That is, it may be possible to come to a direct conclusion of the condition of the rotating system based solely on a shorter sampling period of data from the measurement device(s).

The main bearing should in the present context be understood as any type of bearing suitable for use in a rotating system such as a single or double row tapered roller bearing, a cylindrical roller bearing, a spherical roller bearing or a ball bearing. The bearing may further comprise a cage or a plurality of cages arranged between the outer and inner ring for keeping the rolling elements in place. The cage may for example be made from a metallic material such as brass or steel, or from a polymer such as polyether ether ketone polymer (PEEK) or a similar polymer based material.

In a preferred embodiment, the monitoring arrangement further comprise a second measurement device configured to be arranged at a second location in proximity of the main bearing, on the other side of the main bearing, for determining a second measurement indicative of an electric current flow at the second location, the control unit being connected to the measurement device, wherein the first parameter is determined based on a difference between the first and the second measurement corresponding to an electric current flowing through the main bearing.

Accordingly, by determining a difference between e.g. an electric current flowing on one side of the main bearing and an electric current flowing on the other side of the main bearing, a leakage current (profile) may be calculated and in turn compared and matched to corresponding predetermined current flow profiles. In relation o the above discussion of pitch motor states, it is further noted that for example a small leakage current during a long time period (e.g. steady run mode) have larger implications on the main bearing than an in comparison higher leakage current during a shorter time period (stop mode). This observation is preferably taking into account when classify the resulting condition.

Preferably, at least one of the first and the second measurement device comprises a coil configured to be arranged around the main shaft of the rotating system. By arranging a coil around the main shaft, a change in the electrical current through the main shaft will give rise to a voltage in the coil. An air-cored coil such as a Rogowski type coil may advantageously be used. The coil is placed around the main shaft in a toroidal fashion so that alternating magnetic field produced by the electrical current induces a voltage in the coil. The voltage is integrated to produce a waveform representing the electrical current in the main shaft. Thereby, a first and a second waveform may be produced and by taking the difference of the two waveforms, the electrical current through the bearing may be deduced. An advantage of using a coil for measuring the electrical current is that it may be arranged around the main shaft without interfering with other parts of the rotating system. Furthermore, by using a Rogowski-type coil which is open ended, integration of the coils in existing systems is greatly simplified. However, any type of coil able to detect electrical current which may be arranged around the main shaft is feasible. Additionally, as there is no contact between the coils and any moving parts, there is no wear on the components and the required maintenance is therefore kept at a minimum.

In a preferred embodiment, the control unit may further be configured to receive status information relating to the rotating system, including at least one of rotational speed of the main shaft, operational mode of the rotating system. In case the rotating system comprises one or a plurality of pitch motors, information as to the operational condition of the one or plurality of pitch motors may be received by the control unit. Additionally, in relation to a wind turbine, the control unit may preferably be arranged to also receive information as to at least one of the external wind speed, wind direction, temperature, etc. The information from each of the different components of the rotating system may be combined for determining a condition of and predicting the possible failure of e.g. the main bearing or other components of the rotating system.

In a preferred embodiment, the control unit is arranged remotely from the rotating system, connected to at least one of the first and second measurement device via a network. Accordingly, information relating to the condition, and the indication of an alarm if the relevance level is above a predetermined threshold may be received at a management site for a plurality of rotating systems, such as for example a wind farm.

According to another aspect of the present invention, there is provided a method for monitoring a condition of a rotating system comprising a main bearing, the method comprising receiving a first measurement indicative of an electric current flow from a first measurement device arranged at a first location in proximity of the main bearing, forming a first parameter based on the first measurement, matching the first parameter with a plurality of predetermined current flow profiles, each of the plurality of predetermined current flow profiles being indicative of a condition of the rotating system, determining, if a matching current flow profile is found, a relevance level for the corresponding condition, and providing an indication of an alarm if the relevance level is above a predetermined threshold. This aspect provides similar advantages as discussed above.

According to still another aspect, there is provided a computer program for causing a control unit to apply the method as discussed above. Also this aspect provides similar advantages as discussed above. The computer readable medium may be one of a removable nonvolatile random access memory, a hard disk drive, a floppy disk, a CD-ROM, a DVD-ROM, a USB memory, an SD memory card, or a similar computer readable medium known in the art.

According to a still further aspect of the present invention, there is provided a management server for monitoring a rotating system comprising a main bearing, wherein the management server is configured to receiving a first measurement indicative of an electric current flow at a first location in proximity of the main bearing, forming a first parameter based on the first measurement, matching the first parameter with a plurality of predetermined current flow profiles, each of the plurality of predetermined current flow profiles being indicative of a condition of the rotating system, determining, if a matching current flow profile is found, a relevance level for the corresponding condition, and providing an indication of an alarm if the relevance level is above a predetermined threshold.

With reference to the above described monitoring arrangement, method and computer program, the management server is advantageous in similar manners and allows for improvements relating to the monitoring and fault prediction in relation to a rotating system, resulting in increased efficiency of the rotating system. A further discussion in relation to the monitoring arrangement and possibly connected management server will be given below in relation to the detailed description of the invention.

Other objectives, features, and advantages of the present invention will appear from the following detailed disclosure, from the attached dependent claims as well as from the drawings.

BRIEF DESCRIPTION OF DRAWINGS

These and other aspects of the present invention will now be described in more detail, with reference to the appended drawings showing at least one example embodiment of the invention, wherein.

DETAILED DESCRIPTION OF EMBODIMENTS OF THE INVENTION

Figure 1A:
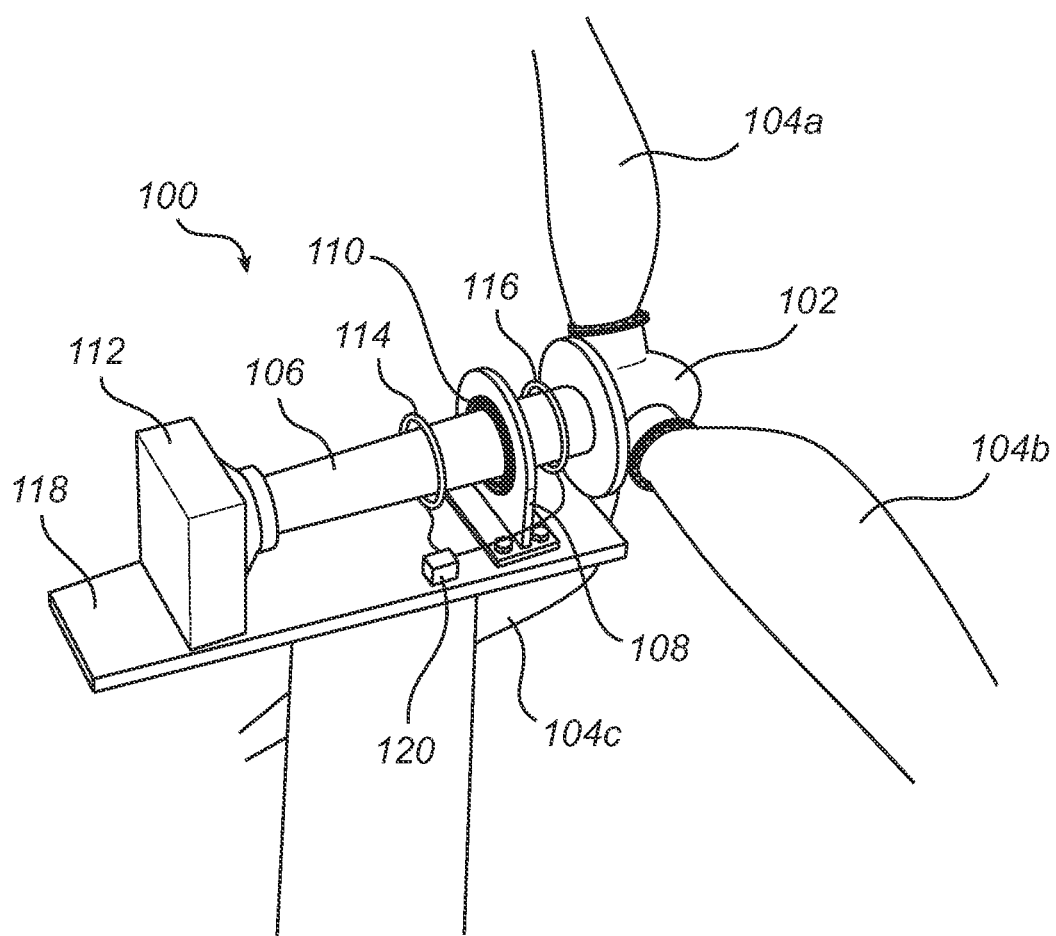
FIG. 1a is a schematic illustration of an exemplary monitoring arrangement arranged in a rotating system, and FIG. 1b provides a detailed view of the control unit of such a monitoring device.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1a in particular, there is depicted a schematic illustration of portions of an exemplary rotating system, such as a wind turbine 100 where a measurement method and system according to the present invention may be used. The wind turbine illustrated in FIG. 1 a hub 102, a plurality of blades 104a-c connected to the hub 102, at least one pitch control motor (not shown) arranged at the hub 102 for controlling the pitch of the blades 104a-c, a main shaft 106 attached to the hub 102 and enclosing cabling for providing electrical power to the pitch control motors, a bearing housing 108 attached to a metallic structure 118 acting as electrical earth, and a main bearing 110 having an inner ring attached to the main shaft 106 and an outer ring attached to the bearing housing 108.

A measurement arrangement for detecting an electric current through a main bearing of a rotating system is here shown comprising a first and a second measurement device, each in the form of a coil for measuring current, 114 and 116 arranged around the main shaft 106 on either side of the main bearing 110. Both coils 114 and 116 are electrically connected to a control unit 120 and the coils may for example be Rogowski-type coils. An alternating electric current in the main shaft 106 will induce a voltage in the coils 114 and 116 as the voltage induced in a coil is proportional to the derivative of the electric current in the main shaft 106. The voltage induced in the coils is received by the control unit 120 where it is integrated in order to represent the electric current through the main shaft 106 in the form of a waveform (representing the current flow).

Figure 1B:
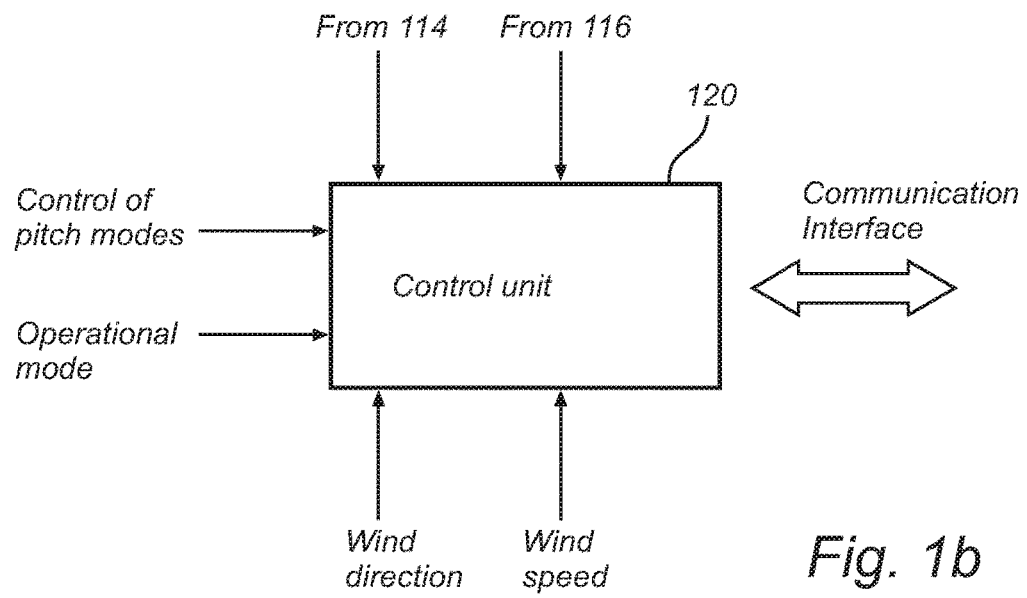

Turning now to FIG. 1b providing a detailed view of a control unit 120 comprised with the measurement arrangement. The control unit 120 may include a microprocessor, microcontroller, programmable digital signal processor or another programmable device. The control unit 120 may also, or instead, include an application specific integrated circuit, a programmable gate array or programmable array logic, a programmable logic device, or a digital signal processor. Where the control unit 120 includes a programmable device such as the microprocessor, microcontroller or programmable digital signal processor mentioned above, the processor may further include computer executable code that controls operation of the programmable device.

Figure 2:
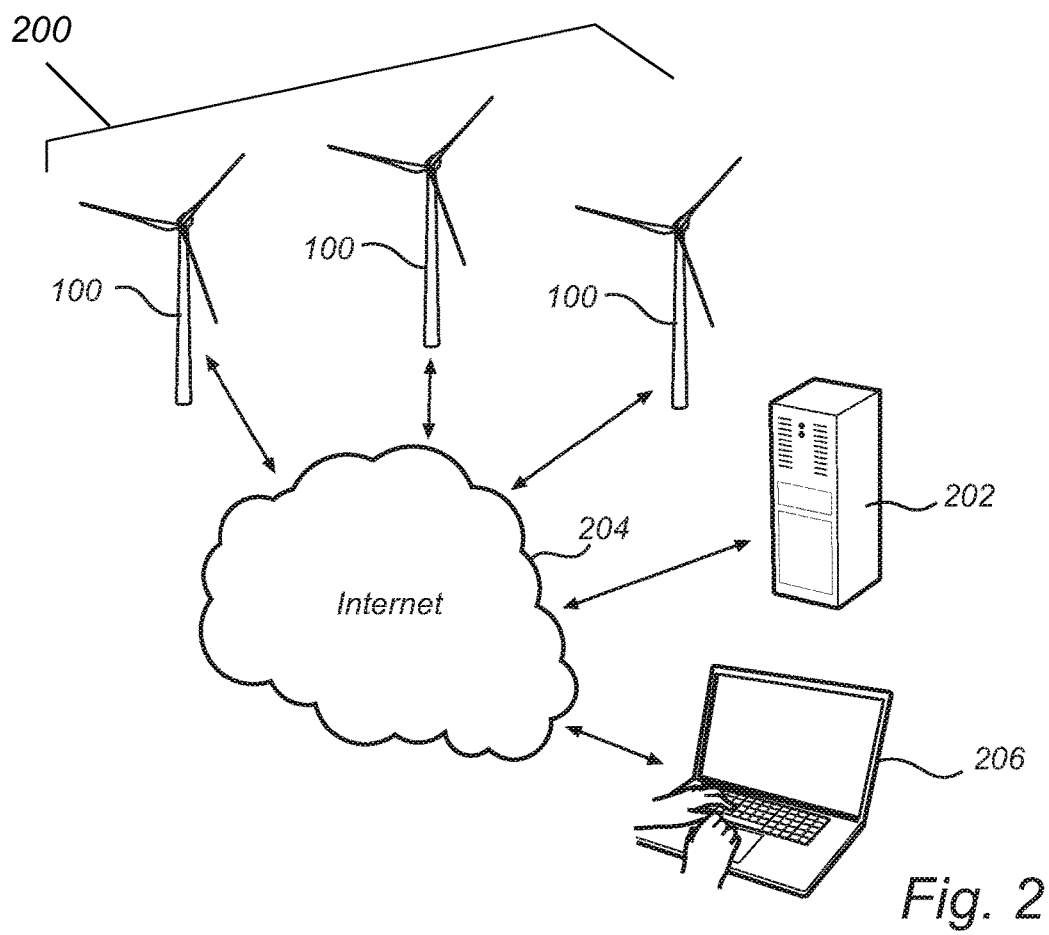
FIG. 2 provides an illustration of a wind farm managed using a management server according to a currently preferred embodiment of the invention.

The control unit 120 additionally comprises a communication interface for allowing wired and/or wireless communication with e.g. a management server 202 remotely located away from the wind turbine 100 and arranged to manage a plurality of wind turbines of e.g. a wind farm 200, with further reference to FIG. 2. The communication between the control unit 120 and the remotely arranged management server 202 may for example be implemented by using mobile or non-mobile communication protocols, IP based protocols, and combinations of these and further protocols, for example over the Internet 204.

The control unit is preferably further configured to receive extended information from a plurality of components of the wind turbine 100 and thereto related sensors, including for example information relating to wind speed/direction, outside temperature, vibration, moisture level, etc. The control unit 120 is in turn configured to process and correlate the extended information with information relating to the measurement provided my means of the first and optionally the second measurement devices for determining a condition of the wind turbine to for example be transmitted to the remotely located management server 202. Different information may be extracted from the determined condition. For example, based on the observation of an increasing current flow, it could be possible to predict moisture effects on cables used for controlling the pitch motors of the wind turbine 100. Also, it could be possible to get indications as to electrical issues of the wind turbine 100 including for example issues relating to ground loops of the wind turbine 100 or parts of the wind turbine 100. Other electrical issues may in a similar manner be extracted from the determined condition.

Furthermore, the management server 202 may in turn be remotely accessed using for example a computer 206 having a thereto provided user interface, where the computer 206 is connected to the management server 202 over the Internet 204.

Figure 3:
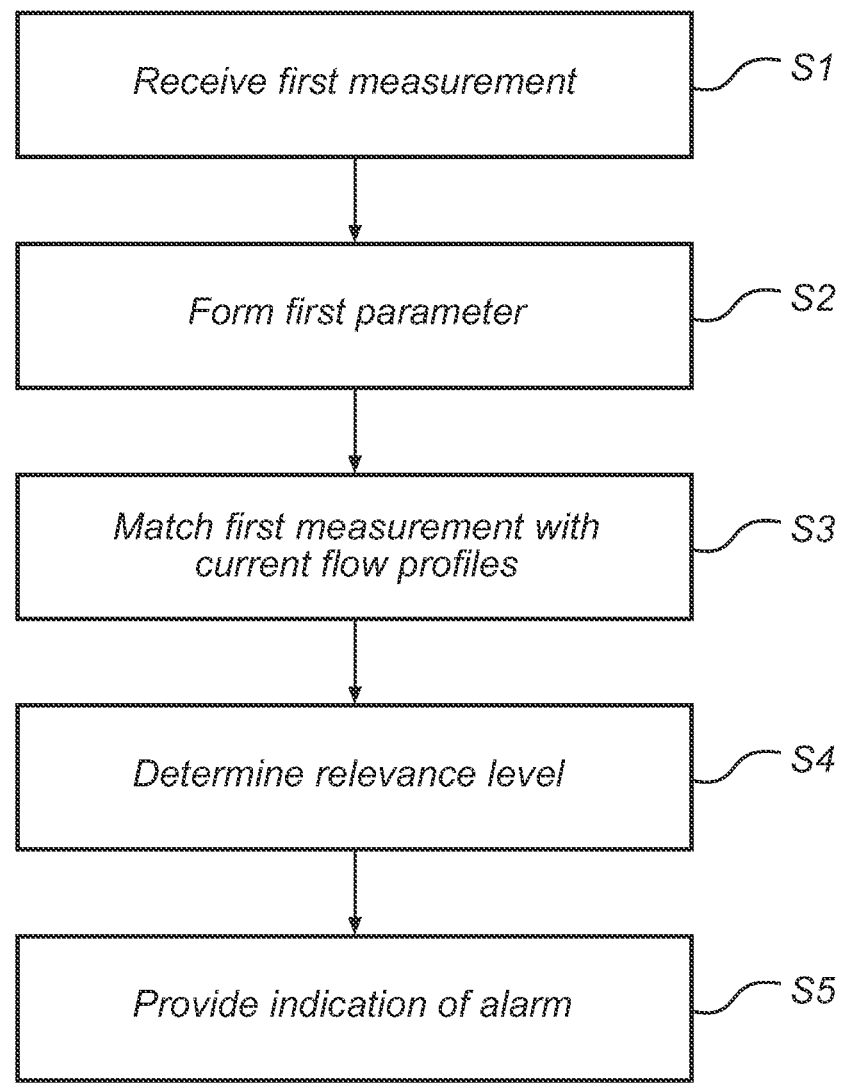
FIG. 3 is a flow chart illustrating the method steps of the present invention.

During operation of the measurement arrangement, with further reference to FIG. 3, a first measurement is received, S1, from the first measurement device 114. Based on the first measurement, a first parameter is formed, S2, and then matched, S3, with a plurality of predetermined current flow profiles. If a matching current flow profile is found, a relevance level may be determined, S4. If the relevance level is above a predetermined threshold, an indication of an alarm is provided, S5.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The person skilled in the art realizes that the present invention by no means is limited to the preferred embodiments described above. For example, even though the embodiments disclosed above relates to the detection of AC current in a main shaft in a wind turbine application, it is equally possible to provide measurement devices for detecting direct currents in a main shaft for example in a marine application. Although pitch control is used in many ships, stray current issues for ships may more often be related to the use of dissimilar materials in an electrolyte (sea water).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A monitoring arrangement configured to monitor a condition of a wind mill or wind turbine having a main bearing, the monitoring arrangement comprising:
   a first measurement device at a first location on a first side of the main bearing that determines a first measurement indicating a current flow at the first location;
   a second measurement device at a second location on a second side of the main bearing, the second side is an opposite side of the first side, that determines a second measurement indicating a current flow at the second location; and
   a control unit connected to the first measurement device and the second measurement device, wherein the control unit is further configured to:
   form a first parameter based on the first measurement and the second measurement;
   match the first parameter with a plurality of predetermined current flow profiles, each of the plurality of predetermined current flow profiles being indicative of a condition of the main bearing;
   determine, if a matching current flow profile is found within the plurality of predetermined current flow profiles, a relevance level for the corresponding condition;
   provide an indication of an alarm if the relevance level is above a predetermined threshold; and
   predict the main bearing failure of the wind mill or wind turbine based on the matching current flow profile and historically matched current profiles for the corresponding condition.

2. The monitoring arrangement according to claim 1, wherein the first parameter is determined based on a difference between the first and the second measurement corresponding to a current flowing through the main bearing.

3. The monitoring arrangement according to claim 2, wherein the wind mill or wind turbine includes a main shaft and at least one of the first and the second measurement device includes a coil configured to be arranged around the main shaft of the wind mill or wind turbine.

4. The monitoring arrangement according to claim 1, wherein the control unit is further configured to receive status information relating to the wind mill or wind turbine, including at least one of a rotational speed of the main shaft and an operational mode of the wind mill or wind turbine.

5. The monitoring arrangement according to claim 4, wherein the predetermined current flow profiles are dynamically updated depending on the operational mode of the wind mill or wind turbine.

6. The monitoring arrangement according to claim 5, wherein the control unit is arranged remotely from the wind mill or wind turbine, connected to at least one of the first and second measurement device via a network.

7. The monitoring arrangement according to claim 6, wherein the control unit is comprised in a management server.

8. A method for monitoring a condition of a wind mill or wind turbine having a main bearing, by a control unit, comprising: arranging a first measurement device at a first location on a first side of the main bearing that determines a first measurement indicating a current flow at the first location; arranging a second measurement device at a second location on a second side of the main bearing, the second side is an opposite side of the first side, that determines a second measurement indicating a current flow at the second location;
   receiving, by the control unit, the first measurement;
   receiving, by the control unit, the second measurement;
   forming, by the control unit, a first parameter based on the first measurement and the second measurement;
   matching, by the control unit, the first parameter with a plurality of predetermined current flow profiles, each of the plurality of predetermined current flow profiles being indicative of a condition of the main bearing;
   determining, by the control unit, if a matching current flow profile is found within the plurality of predetermined current flow profiles, a relevance level for the corresponding condition;
   providing, by the control unit, an indication of an alarm if the relevance level is above a predetermined threshold; and
   predict the main bearing failure of the wind mill or wind turbine based on the matching current flow profile and historically matched current profiles for the corresponding condition.

9. The computer-implemented method according to claim 8, further comprising:
   determining a difference between the first measurement and the second measurement corresponding to a current flowing through the main bearing; and
   forming the first parameter based on the difference between the first measurement and the second measurement.

10. A system comprising: a first measurement device at a first location on a first side of the main bearing that determines a first measurement indicating a current flow at the first location; a second measurement device at a second location on a second side of the main bearing, the second side is an opposite side of the first side, that determines a second measurement indicating a current flow at the second location; and a management server comprising a processor and a non-transitory memory storing program instructions for monitoring a wind mill or wind turbine having a main bearing thereon, the program instructions executable by the processor to cause the management server to:

receive the first measurement; receive the second measurement;

form a first parameter based on the first measurement and the second measurement;

match the first parameter with a plurality of predetermined current flow profiles, each of the plurality of predetermined current flow profiles being indicative of a condition of the main bearing;

determine, if a matching current flow profile is found within the plurality of predetermined current flow profiles, a relevance level for the corresponding condition;

provide an indication of an alarm if the relevance level is above a predetermined threshold; and predict the main bearing failure of the wind mill or wind turbine based on the matching current flow profile and historically matched current profiles for the corresponding condition.

11. The management server according to claim 10, further configured to determine a difference between the first measurement and the second measurement corresponding to a current flowing through the main bearing; and form the first parameter based on the difference between the first measurement and the second measurement.

* * * * *